United States Patent
Sivabalan et al.

(10) Patent No.: US 9,722,916 B2
(45) Date of Patent: Aug. 1, 2017

(54) DATA-PLANE DRIVEN FAST PROTECTION MECHANISM FOR MPLS PSEUDOWIRE SERVICES

(71) Applicant: Cisco Technology, Inc., San Jose, CA (US)

(72) Inventors: Muthurajah Sivabalan, Kanata (CA); Sami Boutros, San Ramon, CA (US); George Swallow, Boston, MA (US); Simon Spraggs, Hants (GB)

(73) Assignee: Cisco Technology, Inc., San Jose, CA (US)

( * ) Notice: Subject to any disclaimer, the term of this patent is extended or adjusted under 35 U.S.C. 154(b) by 298 days.

(21) Appl. No.: 14/041,392

(22) Filed: Sep. 30, 2013

(65) Prior Publication Data
US 2015/0092539 A1    Apr. 2, 2015

(51) Int. Cl.
*H04L 12/707*  (2013.01)
*H04L 12/703*  (2013.01)
(Continued)

(52) U.S. Cl.
CPC .............. *H04L 45/22* (2013.01); *H04L 12/42* (2013.01); *H04L 12/437* (2013.01);
(Continued)

(58) Field of Classification Search
CPC ....... H04L 45/28; H04L 12/437; H04L 45/22; H04L 69/40; H04L 45/50; H04L 47/746; H04L 12/42; H04L 2/5695
(Continued)

(56) References Cited

U.S. PATENT DOCUMENTS

| | | | | |
|---|---|---|---|---|
| 5,442,620 A | * | 8/1995 | Kremer | H04J 3/085 370/224 |
| 7,940,652 B1 | * | 5/2011 | Pan | 370/228 |

(Continued)

FOREIGN PATENT DOCUMENTS

| | | | |
|---|---|---|---|
| WO | WO 03/005629 | * | 1/2003 |
| WO | WO 2012/092824 | * | 12/2012 |

OTHER PUBLICATIONS

Sharma, et al., "Framework for Multi-Protocol Label Switching (MPLS)—Based Recovery", CA Network Working Group, Request for Comments 3469, Feb. 2003, 40 pages.*

(Continued)

*Primary Examiner* — Ian N Moore
*Assistant Examiner* — Mewale Ambaye
(74) *Attorney, Agent, or Firm* — Parker Ibrahim & Berg LLC; James M. Behmke; Stephen D. LeBarron

(57) ABSTRACT

In one embodiment, a source transmits one or more data packets to a destination over a primary pseudowire (PW). When a device on the primary PW detects a downstream failure of the primary PW, and in response to receiving one or more data packets from a source from the failed primary PW, the device adds a loopback packet identifier to the one or more received data packets, and returns the one or more data packets with the loopback packet identifier to the source upstream on the primary PW. Accordingly, in response to receiving the data packet returned with a loopback packet identifier from the primary PW (in response to the downstream failure), the source retransmits the one or more data packets to the destination over a backup PW.

18 Claims, 16 Drawing Sheets

(51) Int. Cl.
    *H04L 12/42*     (2006.01)
    *H04L 12/911*    (2013.01)
    *H04L 12/723*    (2013.01)
    *H04L 12/54*     (2013.01)
    *H04L 12/437*    (2006.01)
    *H04L 12/721*    (2013.01)

(52) U.S. Cl.
    CPC .......... *H04L 12/5695* (2013.01); *H04L 45/28* (2013.01); *H04L 45/50* (2013.01); *H04L 45/68* (2013.01); *H04L 47/746* (2013.01); *H04L 47/825* (2013.01)

(58) Field of Classification Search
    USPC ........................................................ 370/225
    See application file for complete search history.

(56) References Cited

U.S. PATENT DOCUMENTS

| | | | |
|---|---|---|---|
| 8,004,964 B2 | 8/2011 | Boutros et al. | |
| 8,081,563 B2 | 12/2011 | Guichard et al. | |
| 8,160,055 B1* | 4/2012 | Nadeau | H04L 12/4633 370/229 |
| 8,179,900 B2* | 5/2012 | Kitada | H04L 45/00 370/217 |
| 8,533,340 B2* | 9/2013 | Ratcliffe | H04L 65/105 709/223 |
| 9,229,730 B2* | 1/2016 | Amann | G06F 9/4401 |
| 2002/0133698 A1* | 9/2002 | Wank | H04L 45/00 713/151 |
| 2004/0202467 A1* | 10/2004 | Luft | H04B 10/032 398/4 |
| 2006/0098660 A1* | 5/2006 | Pal | H04J 3/085 370/395.51 |
| 2007/0036178 A1* | 2/2007 | Hares | H04L 45/00 370/490 |
| 2008/0186875 A1* | 8/2008 | Kitani | H04L 41/0816 370/254 |
| 2009/0285089 A1* | 11/2009 | Srinivasan | H04L 12/4633 370/218 |
| 2010/0238788 A1* | 9/2010 | Boutros | H04L 43/0811 370/216 |
| 2012/0147737 A1* | 6/2012 | Taylor et al. | 370/219 |

OTHER PUBLICATIONS

Sharma et al. (hereinafter referred as Sharma) an NPL document; "Network Working Group (Framework for multi-protocol Label Switching based recovery)", published on Jan. 2003, pp. 40).*
Bellcore et al. NPL document, "SONET Bidirectional Line-Switched Ring Equipment Generic Criteria" issue 4, Dec. 1998.*
Sharma, et al., "Framework for Multi-Protocol Label Switching (MPLS)—Based Recovery", Network Working Group, Request for Comments 3469, Feb. 2003, 40 pages, The Internet Society.
Weingarten, et al., "Applicability of MPLS-TP Linear Protection for Ring Topologies", Network Working Group Internet Draft, draft-ietf-mpls-tp-ring-protection-03.txt, Nov. 2012, 29 pages, Internet Engineering Task Force Trust.

\* cited by examiner

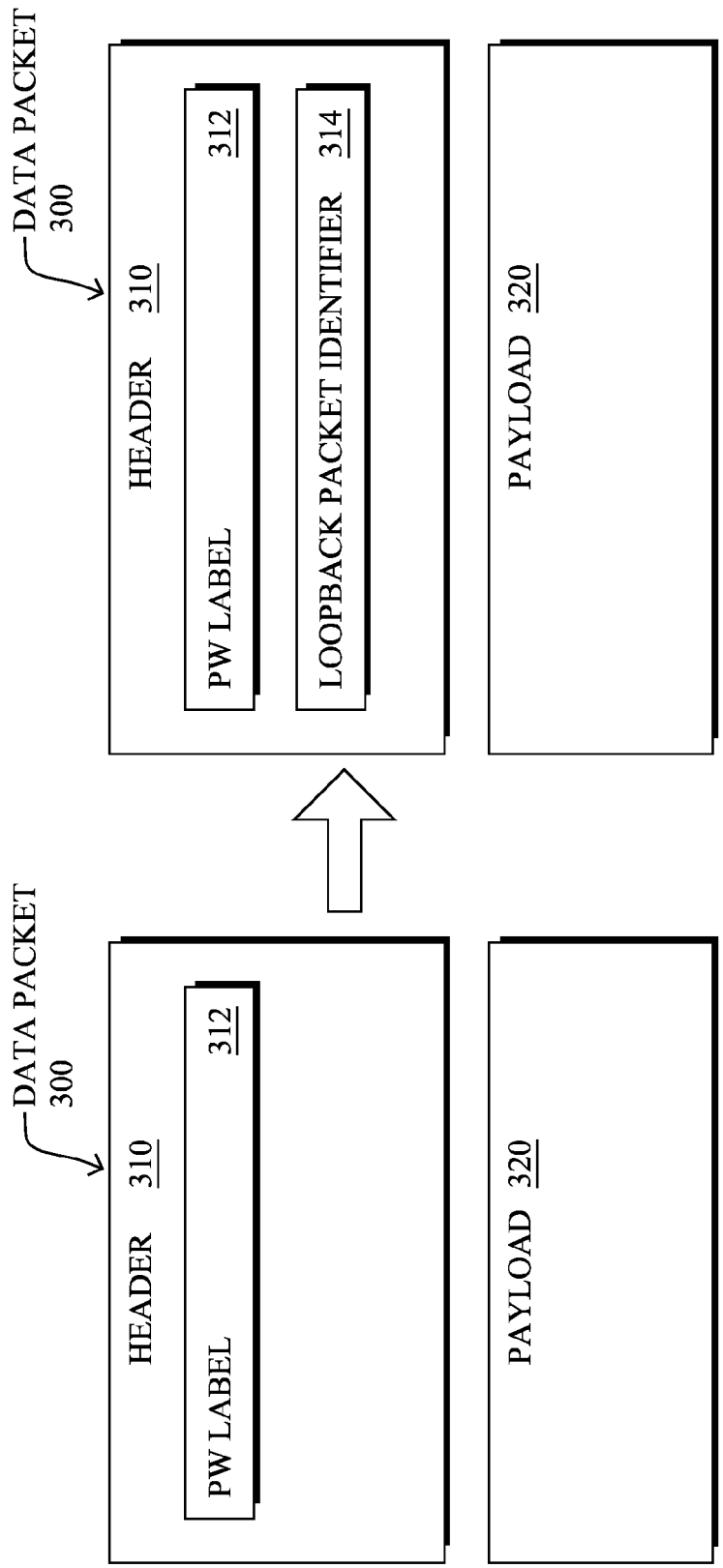

DATA-PLANE DRIVEN FAST PROTECTION MECHANISM FOR MPLS PSEUDOWIRE SERVICES

TECHNICAL FIELD

The present disclosure relates generally to computer networks, and, more particularly, to a protection mechanism for multi-protocol label switching (MPLS) pseudowire services.

BACKGROUND

Service Provider (SP) networks carry real-time traffic such as voice and video over Pseudowire (PW). Due to the type of data carried in SP networks, it is critical to minimize the traffic loss due to PW failure. PW redundancy is a mechanism in which a primary PW is protected by a backup PW. A primary and/or backup PW can be Single Segment Pseudowire (SS-PW) or Multi-Segment Pseudowire (MS-PW).

One method used to signal PW failure is to use a PW status message, which may be carried by the Label Distribution Protocol (LDP) or the Pseudowire-Operation Administration and Maintenance (PW-OAM) protocol to a destination terminating device (end points) of the PW (that is, when one end of the PW detects a failure, a PW status message may be sent from that end to another end to convey the failure to the other end.). While LDP messages are handled in control-plane, the PW-OAM protocol relies on the rapid transition of three messages followed by refresh messages that are sent in-band. If the initial messages do not reach the destination (e.g., due to network congestion), the destination of the PW status notification (terminating device) relies on the subsequent refresh message(s) to learn about the failure. As such, failure notification via PW status message may not always ensure carrier-grade protection (e.g., within sub-50 ms) for PW services, since the traffic loss due to failure depends on failure detection time, failure propagation time to the node hosting a backup PW, and backup PW activation time.

Another common method of detecting PW failures is to monitor the status of the underlying Label Switched Path (LSP) over which the PW runs. In this case, mechanisms associated with the control plane of the LSP (e.g., Resource reSerVation Protocol "RSVP") can be used to detect the failure of the LSP, which in turn invokes the PW switch. Alternatively, LSP OAM and LSP fault management can be used to detect failure of the underlying LSP, which in turn invokes the PW switch. As with PW failure detection mechanisms in certain circumstances, however, a failure may not be detected in the LSP, so the PW affected is not switched to support carrier grade operations.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 3A-3B illustrate example data packet formats;

DESCRIPTION OF EXAMPLE EMBODIMENTS

Overview

Figure 1A:
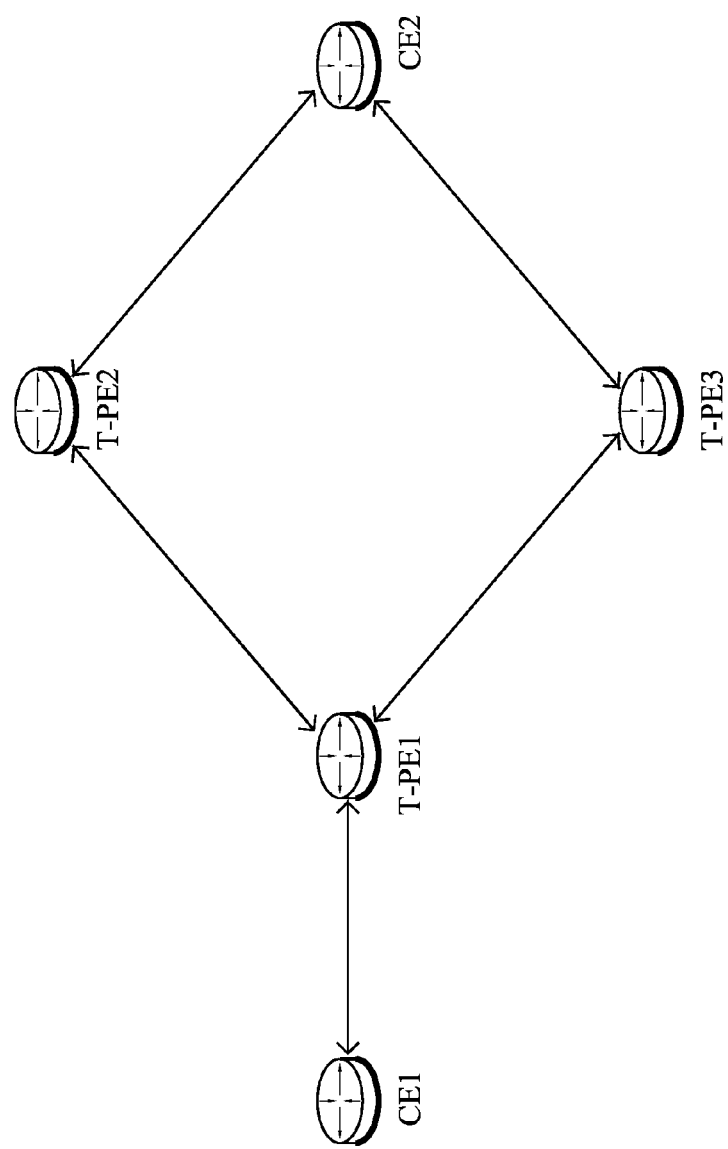
FIGS. 1A-1B illustrate example communication networks.

According to one or more embodiments of the disclosure, a source transmits a data packet to a destination over a primary pseudowire (PW). In response to receiving the data packet returned with a loopback packet identifier from the primary PW (in response to a downstream failure), the source retransmits the data packet to the destination over a backup PW.

According to one or more additional embodiments of the disclosure, a device on the primary PW path detects a downstream failure of the primary PW, and in response to receiving one or more data packets from a source from the failed primary PW, adds a loopback packet identifier (associated with the PW) to the one or more received data packets, and returns the one or more data packets with the loopback packet identifier to the source upstream on the primary PW to cause the source to retransmit the one or more returned data packets on a backup PW.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Pseudowires (PWs) are generally known in the art of computer networking and telecommunications as bidirectional logical links that transfer encapsulated data across a packet-switched network. Single-Segment pseudowires (SS-PWs), for example, may be established directly (e.g., over a single physical link, logical link, tunnel, etc.) between two terminating devices, such as provider edge (PE) devices (e.g., as terminating PEs or "T-PEs") (please note that there may be one or more intermediate node(s) which are typically called Provider (P) nodes/routers/devices. In other words, two T-PEs can either be directly connected (T-PE1 - - - T-PE2) or indirectly connected via one or more P nodes (T-PE1 - - - P - - - P - - - T-PE2). Multi-Segment Pseudowires (MS-PWs), on the other hand, may transit more than one domain between terminating devices, particularly by transiting one or more corresponding switching edge devices, such as switching PEs (S-PEs) (e.g., and/or one or more P devices between a T-PE and S-PE pair, or a pair of S-PEs). For instance, multiple pseudowire segments (e.g., SS-PWs) may be stitched together to create a single end-to-end MS-PW from the source T-PE of the pseudowire to the destination T-PE of the pseudowire via one or more S-PEs.

FIG. 1A is a schematic block diagram of an example computer network 100*a* illustratively comprising nodes/devices configured to operate in accordance with single-segment pseudowires (SS-PWs) through the network, as described below. For instance, two customer edge (CE) devices, CE1 and CE2, may communicate with one another via a collection of service provider devices, such as provider edge (PE) devices T-PE1 connected to CE1 (in a single-homed arrangement), and T-PE2 and T-PE3 connected to CE2 (in a multi-/dual-homed arrangement).

Figure 1B:
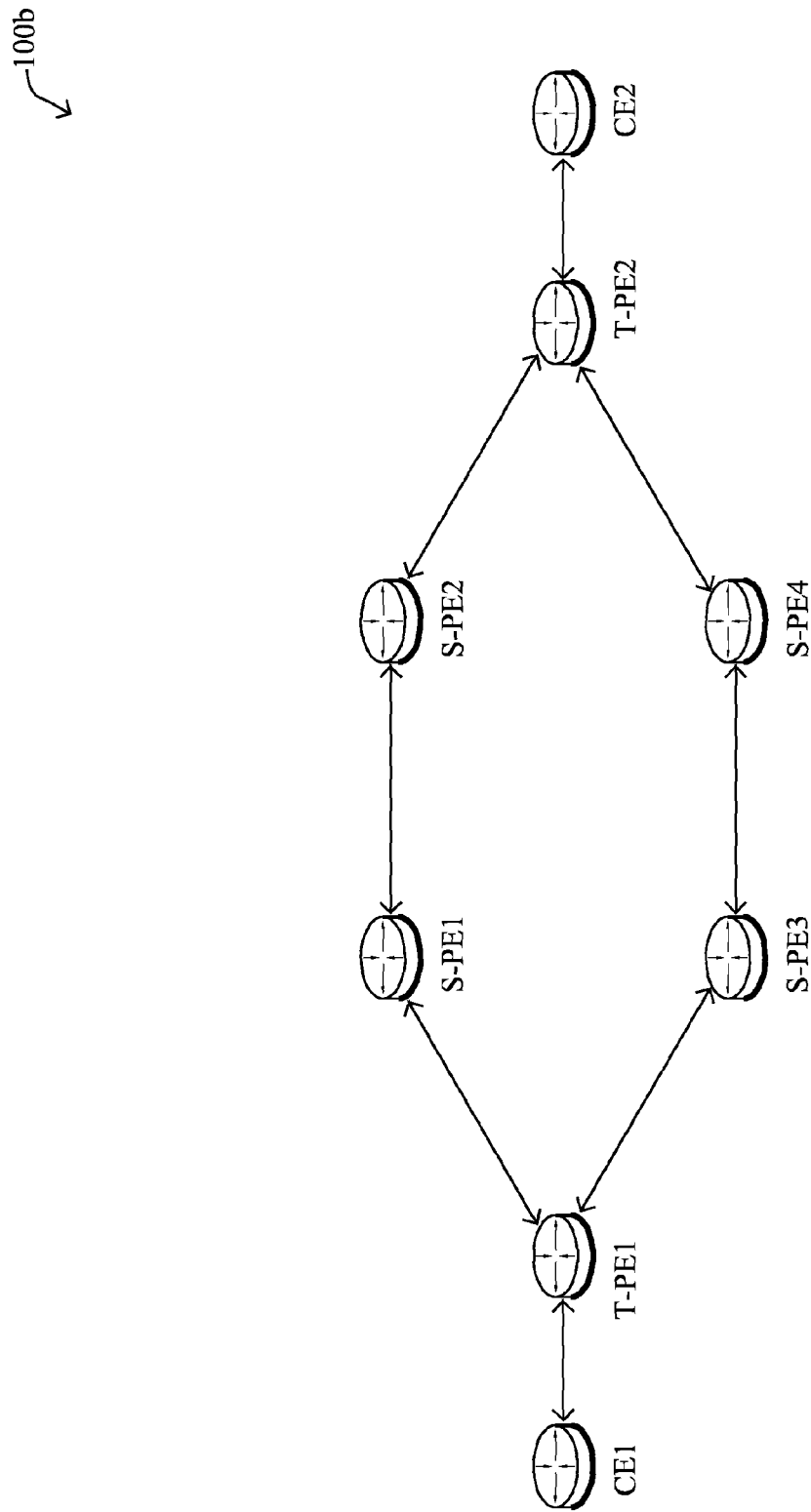

FIG. 1B, on the other hand, is a schematic block diagram of an example computer network 100*b* illustratively comprising nodes/devices configured to operate in accordance with multi-segment pseudowires (MS-PWs) through the network, as also described below. For instance, here each of the two illustrative customer devices may communicate with respective single-homed PE devices, with CE1 illustratively connected with T-PE1 and CE2 illustratively connected with T-PE2. Each of the T-PE devices may connect to one or more S-PEs in order to span the network 100*b*, such as T-PE1 being connected with S-PE1 and S-PE3, while T-PE2 is connected with S-PE2 and S-PE4. As shown, S-PE1 and S-PE3 may then be connected to S-PE2 and S-PE4, respectively.

Notably, a communicative relationship may exist between certain S-PEs (e.g., between S-PE1 and S-PE3 and between S-PE2 and S-PE 4), such as where S-PEs are arranged in a chassis configuration (physically located in a same chassis). Also, while the various PE devices are shown interconnected with direct links, other interconnections may be possible, and particularly one or more provider (P) devices (routers/switches) may be located between the PE devices, such as part of a provider core network. Those skilled in the art will understand that any number of nodes, devices, links, etc. may be used in the computer networks 100*a* and 100*b* ("100" generally), and that the views shown herein is for simplicity.

With reference to FIG. 1A (SS-PW), a customer edge (CE) CE2 is connected dual-homed (via physical links) to T-PE2 and T-PE3, and primary PW is between T-PE1 and T-PE2 and backup PW is between T-PE1 and T-PE3, and CE1 is connected to T-PE1. According to current techniques, when the link between CE2 and T-PE2 fails, T-PE2 detects the failure and sends PW status notification (via LDP or PW-OAM) to T-PE1. Upon receiving PW status notification, T-PE1 activates backup PW and directs the traffic over backup PW. Alternatively, with reference to FIG. 1B (MS-PW), a primary MS-PW consists of T-PE1 - - - S-PE1 - - - S-PE2 - - - T-PE2, and a backup MS-PW consists of T-PE1 - - - S-PE3 - - - S-PE4 - - - T-PE2. When a failure occurs between S-PE1 and S-PE2 (e.g., transport LSP failure, PW connectivity failure between S-PE1 and S-PE2) which impacts the primary PW segment between S-PE1 and S-PE2, S-PE1 and S-PE2 send PW status notifications to T-PE1 and T-PE2, respectively. Upon receiving the PW status notification, T-PE1 and T-PE2 activate a backup PW and start using it for forwarding traffic.

Unfortunately, the current approach has a number of drawbacks. First, failure notification via PW status notification could lead to increased failure detection time at a T-PE (which hosts a backup PW) due to control-plane processing (for LDP-based PW status) or loss and retransmission (for PW-OAM based status). Second, when a large number of PWs are impacted by a given failure, the platform may have to activate corresponding backup PWs one-by-one (that is, in the absence of a level of indirection provided by a "PW group"), potentially increasing the switching delay. Third, if PW grouping is used, a T-PE needs to maintain large number of PW groups, and provides a level of switching indirection, which adds development and operational complexity, and is still bound to control message exchanges and associated delays. In addition, one could also run a connectivity verification protocol (such as bidirectional forwarding detection (BFD)) across the PW, but this solution does not scale.

Accordingly, the duration of traffic loss between fault detection by a remote T-PE or S-PE and activation of a backup PW could become significant with the present approach of using PW status notifications for PW redundancy operation, particularly when a large number of PWs are deployed. With such increased delay, service providers cannot guarantee carrier-grade (e.g., fault detection+switchover delay <50 ms) protection for PW services, since the traffic loss due to failure depends on failure detection time, failure propagation time to the node hosting a backup PW, and backup PW activation time. In particular, since the failure propagation mechanism depends on the distance between the point of failure and the node hosting backup PW as well as the speed at which the failure notification can be propagated, the control plane based mechanism such as LDP-based PW status notification may not yield sufficiently fast notification, particularly when a single failure impacts large number of PWs hosted on a given node. Furthermore, backup PW activation time could also become significant when a single failure impacts large number of PWs hosted on a given node.

The techniques according to the embodiments described herein, on the other hand, prevent these issues by pre-programming a PW forwarding entry with corresponding backup information, such that upon failure of a primary PW, a T-PE or S-PE (or an intermediate node through which a tunnel LSP for the PW traverses) can loop incoming traffic over the impacted PW back to the source, and by using a reserved label (or new channel type) in a PW Control Word to identify the loopback packets. Optionally, the techniques herein may also activate the backup PW upon receiving the first packet with such a loopback packet identifier.

For example, as described in greater detail below, the reception of the first data packet with a loopback packet identifier can be used to learn about a downstream failure on the primary PW, rather than relying on a PW status based notification. In this case, the source node can activate the backup PW upon receiving the first looped-back data packet over the primary PW. However, since activation of the backup PW still requires control plane involvement, when the source node receives the loopback data packets:

1. Its data plane forwards those data packets over the backup PW;
2. While (1) is happening, the reception of the first loopback data packet can be used as indication of primary PW failure;
3. The control plane of the source node learns about the failure via (2) or PW status (typically the former is much faster);
4. The control plane activates the backup PW;
5. The source node forwards all the subsequent data packets over the backup PW (at this stage, the source node can optionally drop any loopback data packet(s) in order to minimize the out-of-order data packet delivery); and
6. When the primary PW comes back up, the source node may revert the data traffic over the primary PW (as it would in conventional behavior).

Illustratively, the techniques described herein may be performed by hardware, software, and/or firmware, such as in accordance with one or more associated processes, which may contain computer executable instructions executed by a processor to perform functions relating to the techniques described herein.

Figure 2:
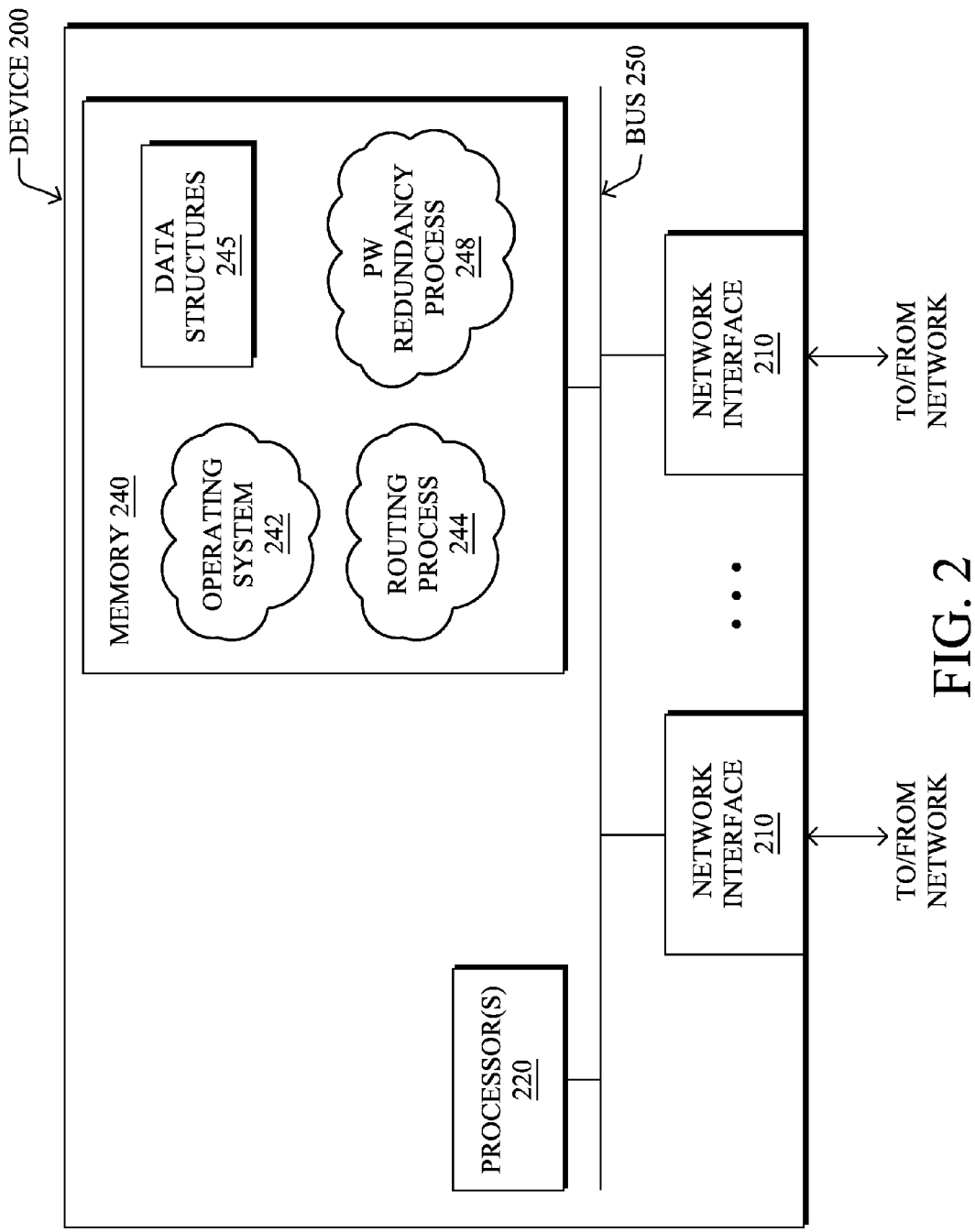
FIG. 2 illustrates an example network device.

FIG. 2 is a schematic block diagram of an example node/device 200 that may be advantageously used with one or more embodiments described herein, e.g., as a PE device (T-PE or S-PE) of the network 100 (in FIGS. 1A and 1B). The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, particularly communication protocols to implement single-segment pseudowires (SS-PWs) or multi-segment pseudowires (MS-PWs) over a packet-switched network, as may be appreciated by those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic configured to execute the software programs and manipulate the data structures 245, such as PW forwarding entries, described below. An operating system 242 (e.g., the Internetworking Operating System, or IOS®, of Cisco Systems, Inc.), portions of which are typically resident in memory 240 and executed by the processor(s) 220, functionally organizes the node by, among other things, invoking network operations in support of software processes and/or services executing on the device. These software processes and/or services may comprise a routing process 244, and in particular, a PW redundancy process 248. Note that while certain processes and/or data structures are shown within central memory 240, alternative embodiments may place certain processes and/or data structures within individual network interfaces 210, as may be appreciated by those skilled in the art.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among routers 200 using routing protocols to "converge" to an identical view of the network topology. Notably, routing services 244 may also perform functions related to virtual routing protocols, such as maintaining VRF instances (not shown), or tunneling protocols, such as for Multi-Protocol Label Switching (MPLS), etc., as will be understood by those skilled in the art.

PW redundancy process 248 contains computer executable instructions executed by processor 220 to perform functions related to PW redundancy operation as a PE (e.g., a T-PE or S-PE), particularly in accordance with single-segment pseudowires (SS-PWs) or multi-segment pseudowires (MS-PWs) in a manner as described herein.

Operationally, when a device (e.g., a T-PE or S-PE) terminating a PW detects a failure impacting downstream PW traffic, it "loops" (returns) the traffic back to the source T-PE with an added identifier (e.g., on a label stack) so that the upstream source T-PE can recognize the returned traffic as a particular kind of loopback traffic. In general, the detecting device (T-PE or S-PE) thus pre-programs a PW with the backup information (e.g., maintaining the identifier along with PW table entries) so that impacted PW traffic can be looped back to the source T-PE as soon as possible.

Illustratively, the added identifier or "loopback label" may be a reserved label (e.g., "15") inserted below a PW label, any arbitrary label value whose purpose is known at both the sending node (e.g., S-PE or T-PE) and receiving node (T-PE) of the loopback traffic, or else may be a newly defined control channel type within a PW Control Word. (Note that the loopback label may be referred to as a "PW Loopback Packet Identifier" or "PW-LPI"). Using either kind of loopback packet identifier (or other kinds not specifically mentioned herein) to identify loopback traffic returned (in the reverse direction over the bidirectional PW), the source (T-PE) may readily recognize a data packet as being loopback PW traffic. As such, if a backup PW exists, the source T-PE forwards (redirects/retransmits) the traffic via the backup PW, accordingly. In this manner, the techniques herein may stop the traffic loss at the point of failure by returning the received data packets, rather than dropping the packets while waiting for conventional PW redundancy mechanisms to be activated. Notably, in one embodiment, upon receiving the loopback traffic (e.g., after the first packet identified with the loopback packet identifier, or any other configured number of received loopback packets to confirm the failure), the source T-PE can optionally activate a backup PW (if one exists) in the control-plane as well (that is, may make the backup PW a primary PW for forwarding traffic to the intended destination). In other words, if the first loopback packet is used as an indication of failure, the source T-PE can activate the backup PW faster as it does not need to wait for PW status notification.

FIGS. 3A and 3B illustrate a simplified example of a data packet 300 transmitted over a PW in accordance with the techniques herein. For instance, in FIG. 3A, the data packet 300 generally comprises a header 310 with various information used to forward the data packet's payload 320. Header information may generally comprise a source address, destination address, various labels (transport labels, link-layer encapsulation, etc.), and particularly as shown, a PW label 312, as will be understood by those skilled in the art. According to the techniques herein, in response to detecting a downstream failure, the detecting device may add a loopback packet identifier 314 (in FIG. 3B) to the returned data packet 300 to indicate that the traffic (data packet) is being looped back to the source due to the detected failure. As noted above, the loopback packet identifier 314 may be a reserved label inserted directly below the PW label 312 in the label stack, or else may be a control channel type within a PW control word, or any arbitrary label either configured or communicated with PW signaling, as may be appreciated by those skilled in the art. When the source T-PE receives the returned data packet with the loopback packet identifier 314, it may remove the label (returning to the format in FIG. 3A), and retransmits the data packet on a backup PW (i.e., with an associated PW label 312). Note that the backup PW label may be different from the primary PW label.

The techniques herein may be demonstrated with respect to both the SS-PW and MS-PW scenarios, with reference to FIGS. 4A-5E, as described below.

Figure 4A:
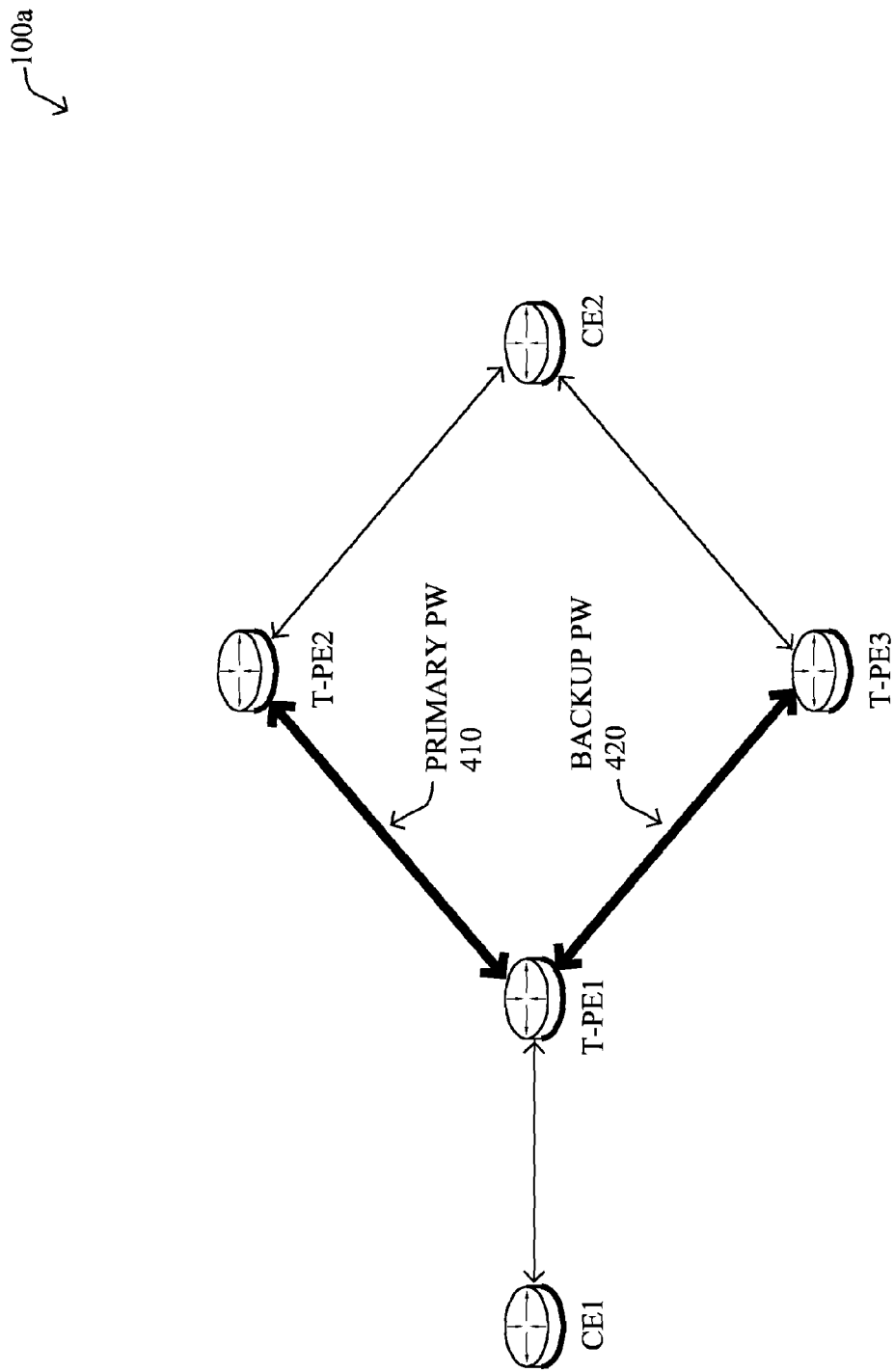
FIGS. 4A-4E illustrate an example of PW redundancy.
Figure 4B:
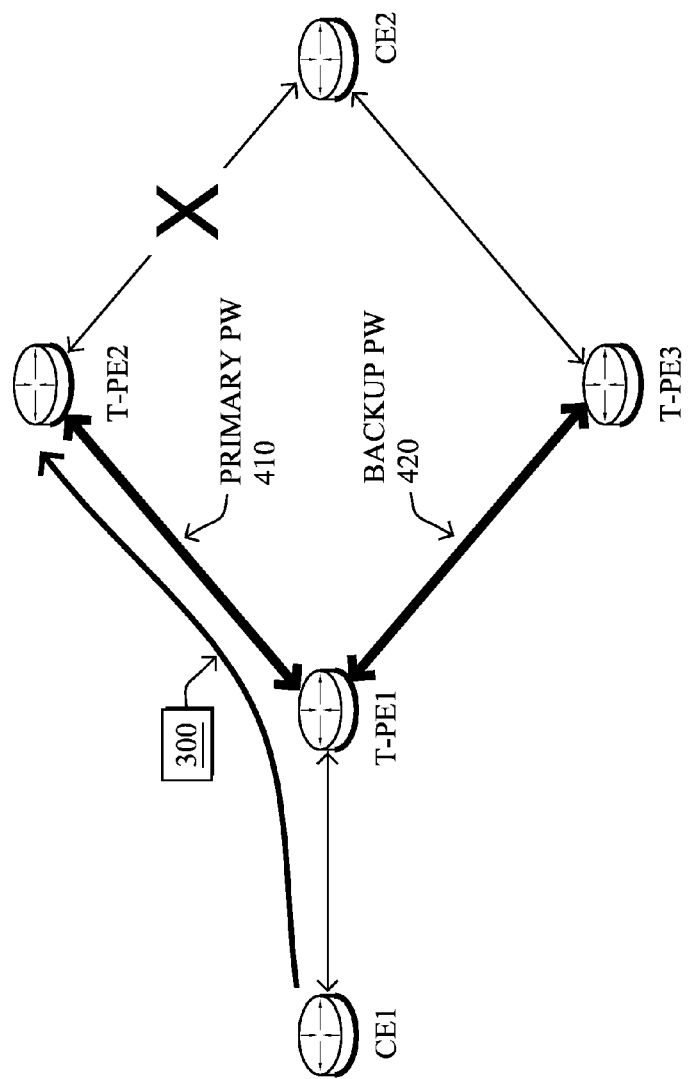
Figure 4C:
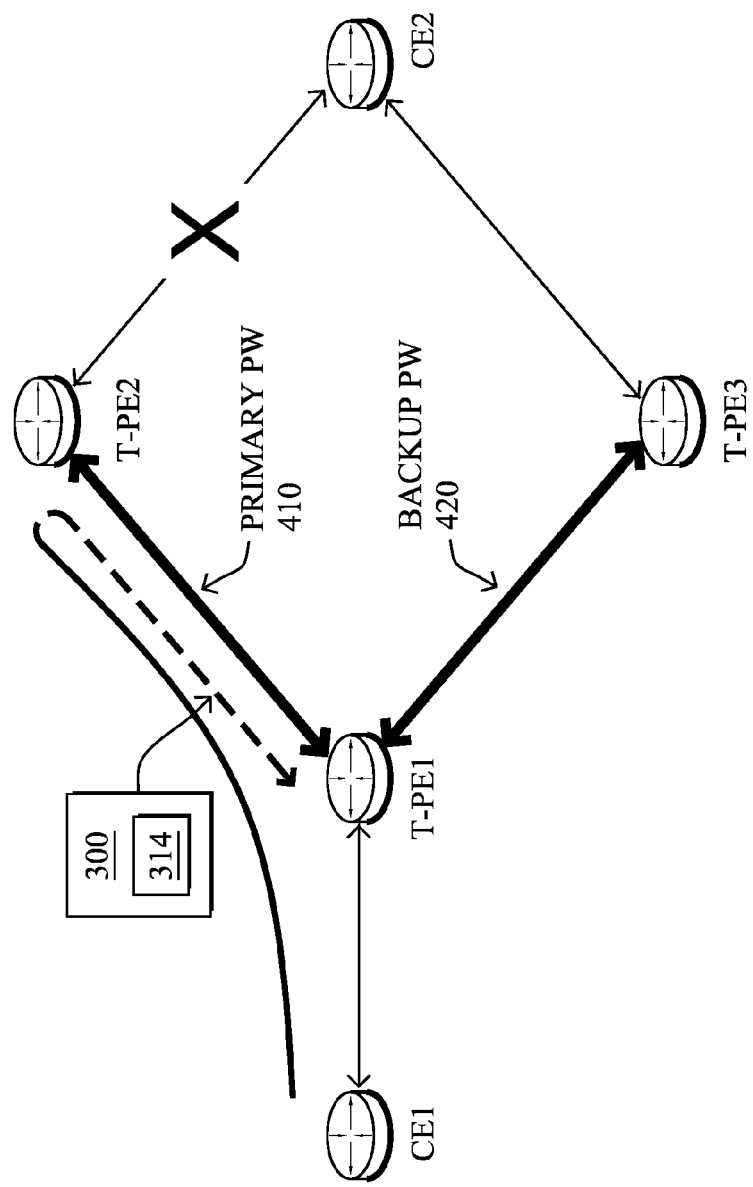
Figure 4D:
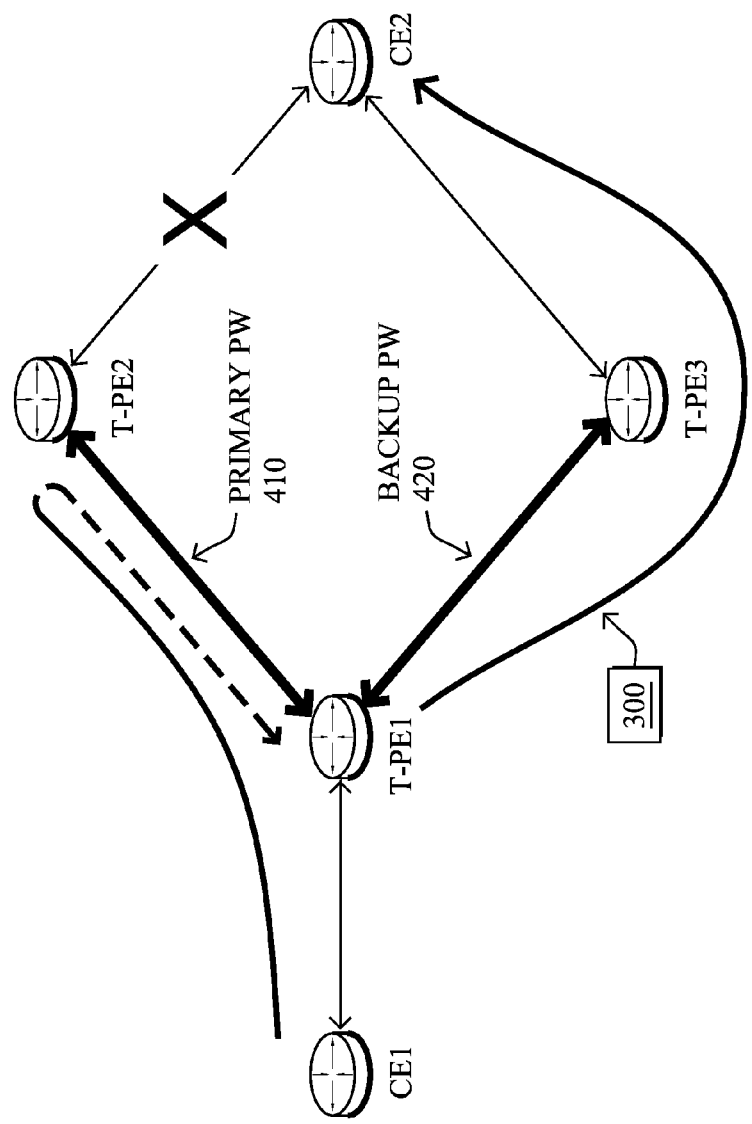
Figure 4E:
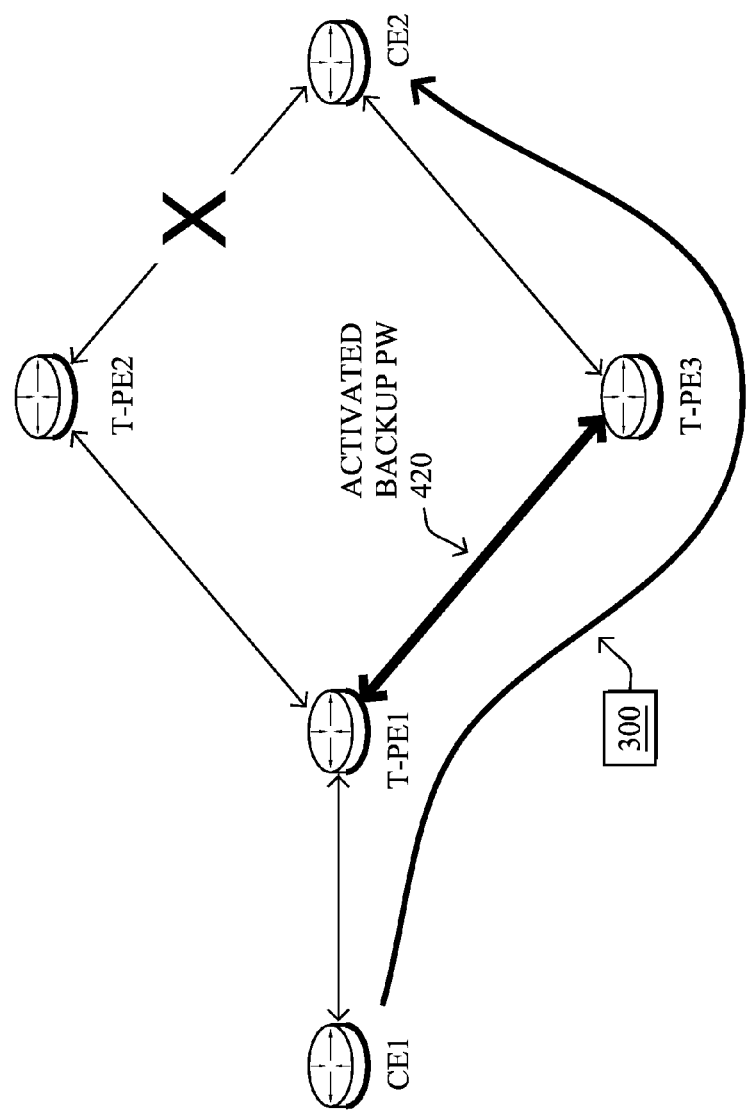

First, with reference to FIG. 4A (e.g., the SS-PW environment of FIG. 1A), CE2 is dual-homed on T-PE2 and T-PE3, and there is a primary PW 410 between T-PE1 and T-PE2, and a backup PW 420 between T-PE1 and T-PE3. Assuming that T-PE2 detects a failure on the link between T-PE2 and CE2 (e.g., at the physical layer) and receives a data packet 300 as shown in FIG. 4B, then as shown in FIG. 4C, T-PE2 loops this incoming traffic back over the primary PW to T-PE1 with the loopback packet identifier 314. When the source T-PE (T-PE1) receives the data packet 300 with the loopback packet identifier 314 over the primary PW 410, it sends the packet to the backup PW 420 as shown in FIG. 4D. Also, as mentioned above, upon receiving the looped back packet (e.g., the first or some subsequent number packet), T-PE1 can optionally activate the backup PW 420 in the control-plane as shown in FIG. 4E (i.e., start using the established backup PW) in order to begin forwarding subsequent data packets toward the destination on the activated PW, accordingly.

Figure 5A:
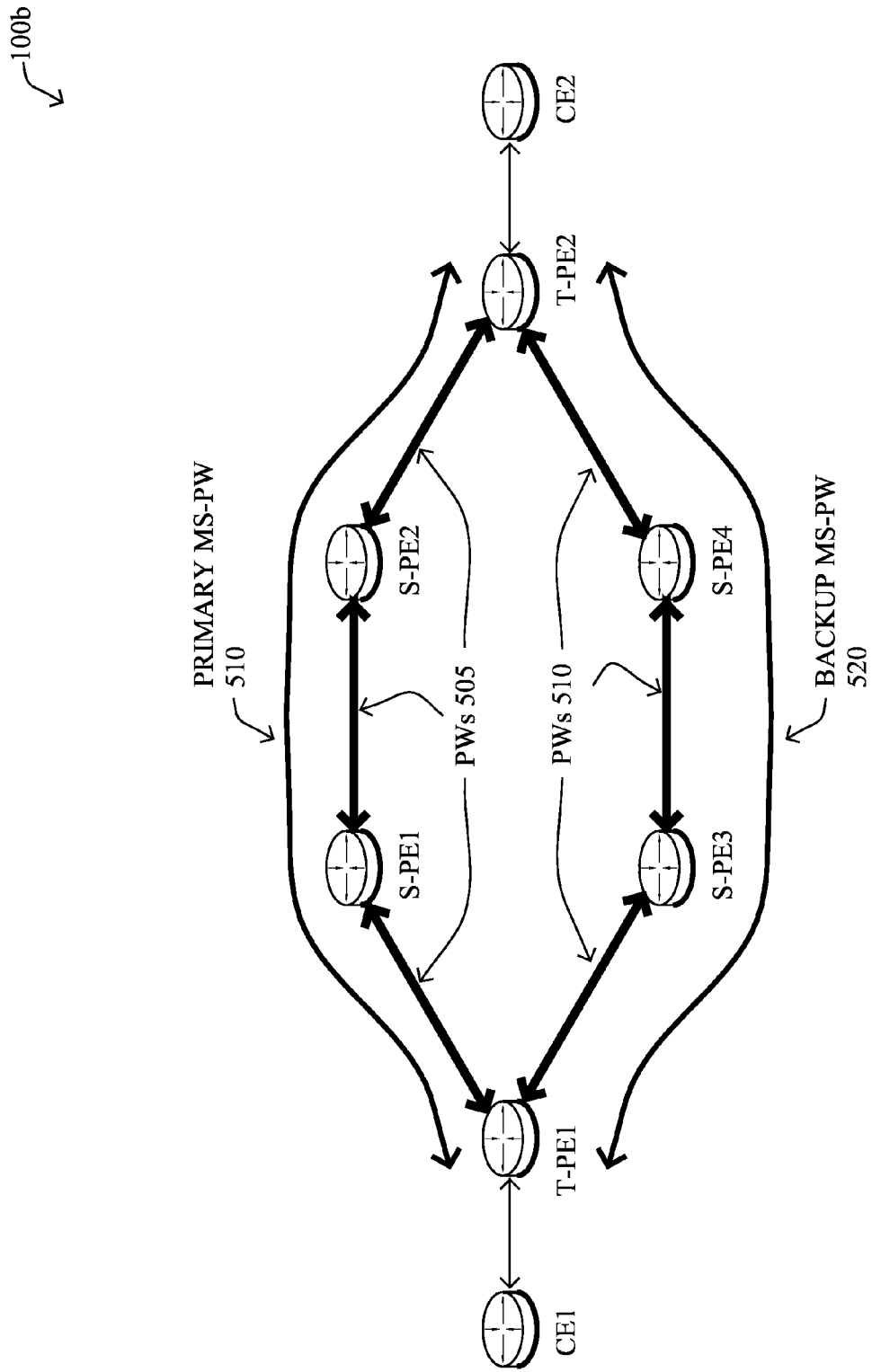
FIGS. 5A-5E illustrate another example of PW redundancy.
Figure 5B:
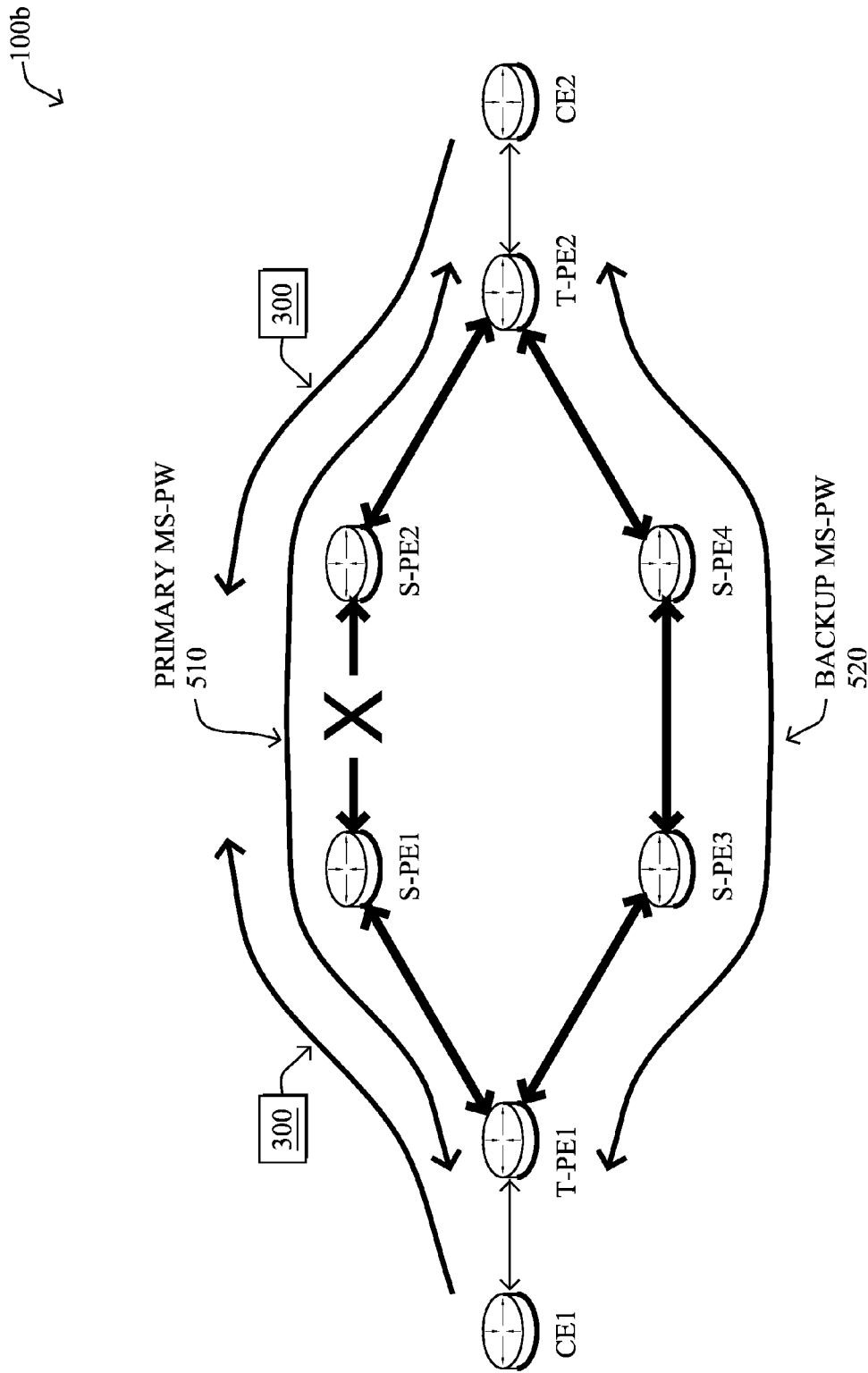
Figure 5C:
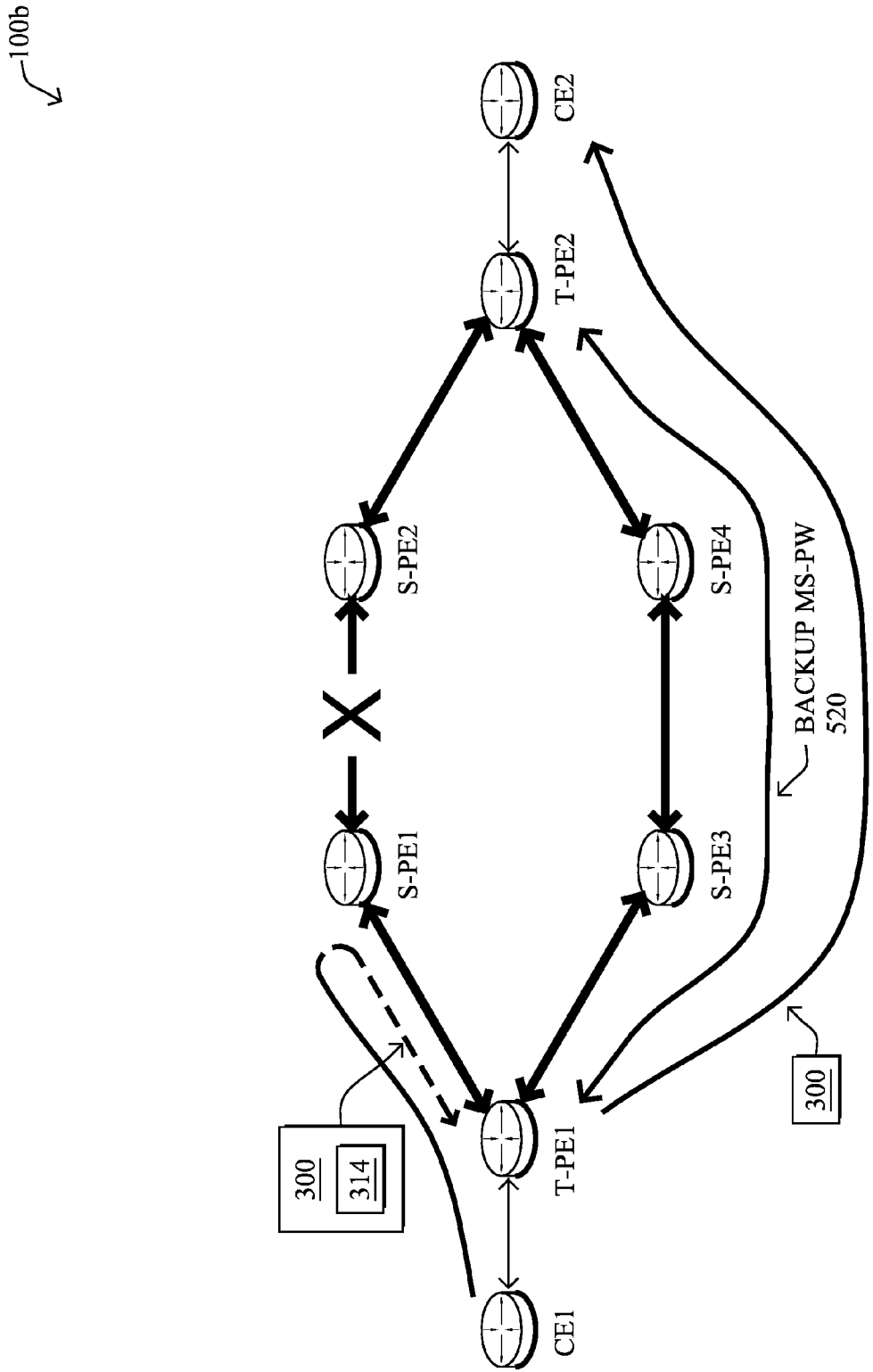
Figure 5D:
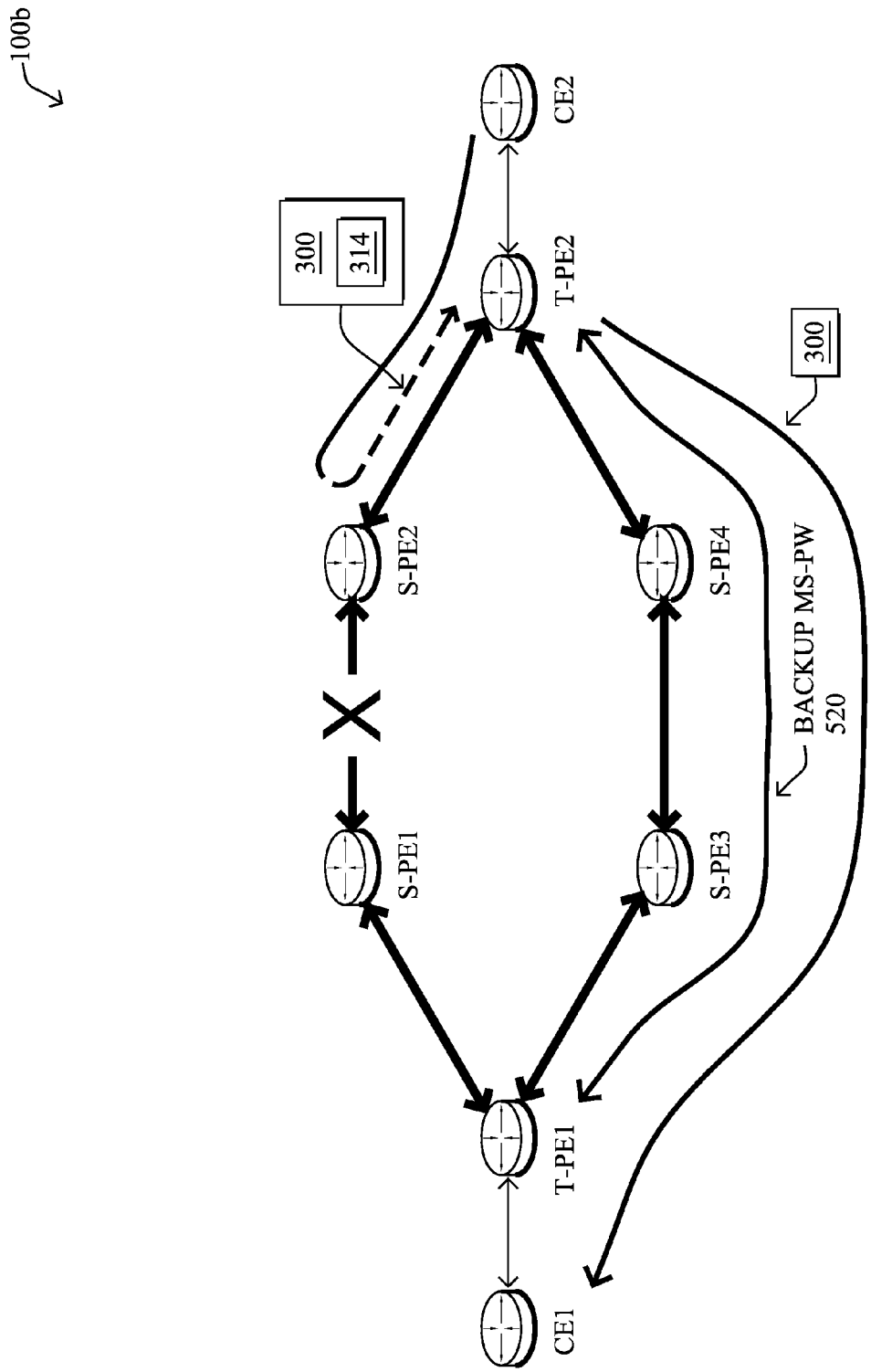
Figure 5E:
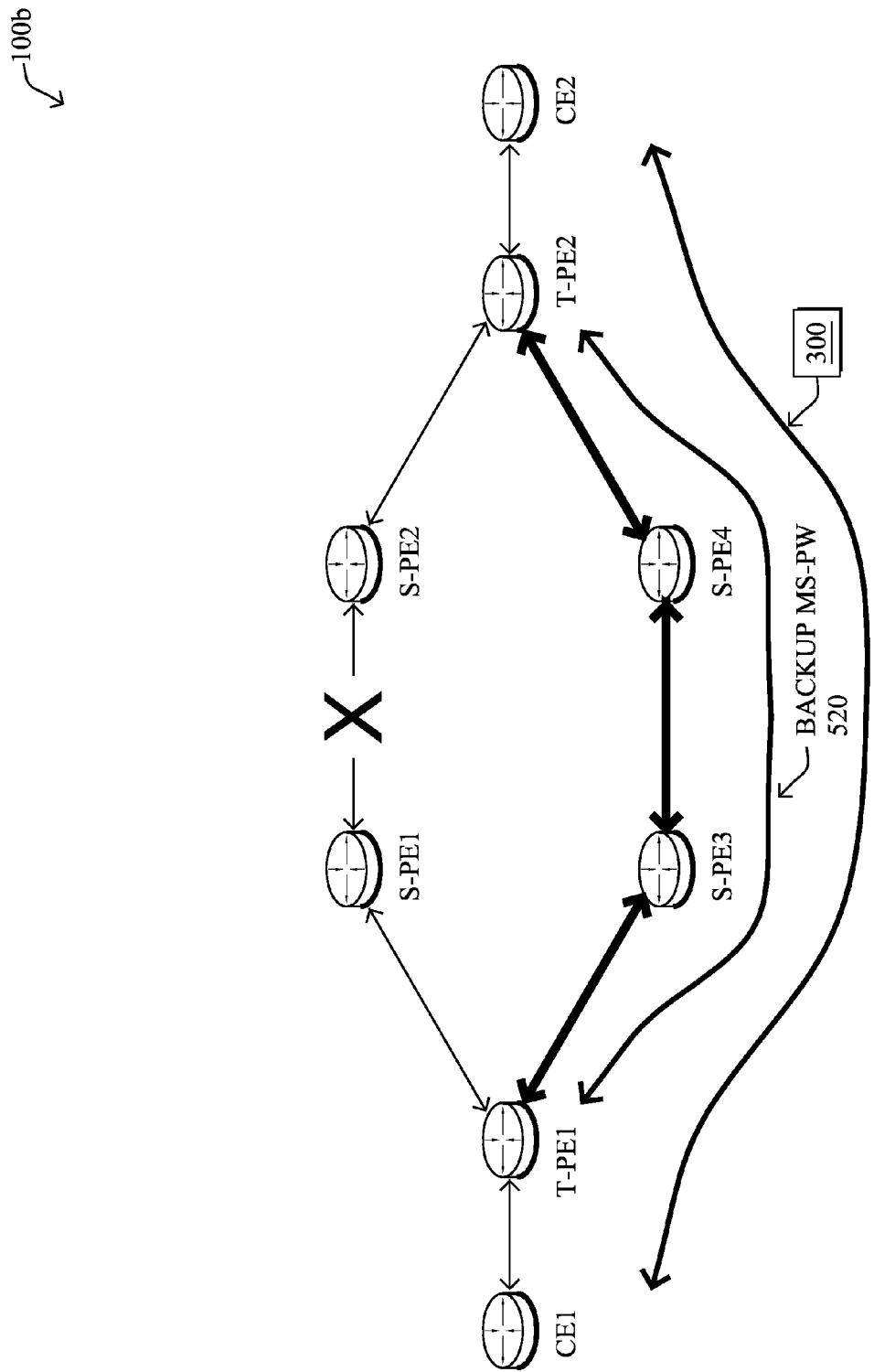

With reference now to FIG. 5A (e.g., the MS-PW environment of FIG. 1B), CE2 is single-homed on T-PE2, but now MS-PWs traverse S-PEs as shown. In particular, in FIG. 5A, there is a primary MS-PW 510 traversing T-PE1 - - - S-PE1 - - - S-PE2 - - - T-PE2, and a backup MS-PW 520 traversing T-PE1 - - - S-PE3 - - - S-PE4 - - - T-PE2. When S-PE1 and S-PE2 detect a failure on the link between them (e.g., causing a transport tunnel label switched path (LSP) between S-PE1 and S-PE2 to fail, with the consequence being that the end-to-end PW fails) as shown in FIG. 5B, incoming traffic (data packets 300) to each failure detecting device may be looped back to their respective sources with the corresponding loopback packet identifier. For instance, in FIG. 5C, S-PE1 loops the incoming traffic over the primary MS-PW 510 back to the source T-PE1, which then retransmits/redirects the traffic onto the backup MS-PW 520 toward the destination (CE2). Similarly, in FIG. 5D, S-PE2 loops the incoming traffic over the primary MS-PW 510 back to the source T-PE2, which then retransmits/redirects the traffic onto the backup MS-PW 520 toward the destination (CE1). Again, as mentioned above, upon receiving the looped back packet, the backup MS-PW 520 may be activated in the control-plane as shown in FIG. 5E in order to forward subsequent data packets toward the destination on the activated MS-PW, accordingly. An important point to note is that all primary MS-PWs that are impacted by a given failure at a detecting device (e.g., at S-PE1) may be programmed such that a single update from software to hardware will enable all such MS-PWs to operate in loopback mode (a level of indirection).

Notably, in either scenario described above, when the source T-PE switches to using the backup PW then returns to using the primary PW once repaired, there may be PW packets received out of order at the destination. Handling of out-of-order packets, however, is generally controlled by applications.

Figure 6:
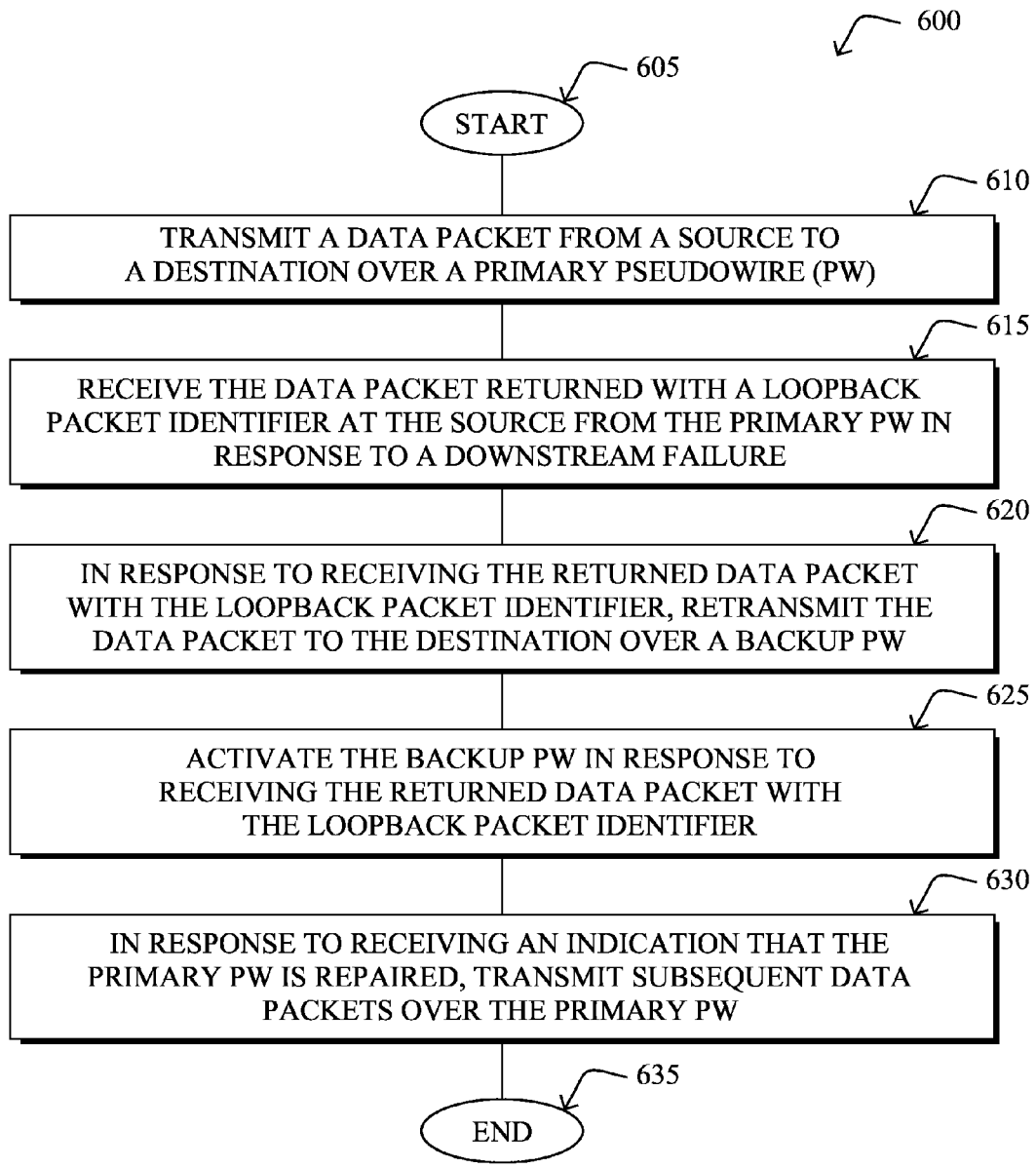
FIG. 6 illustrates an example simplified procedure for a data-plane driven fast protection mechanism for MPLS pseudowire services, particularly from the perspective of a source device.

FIG. 6 illustrates an example simplified procedure 600 for a data-plane driven fast protection mechanism for MPLS pseudowire services in accordance with one or more embodiments described herein, particularly from the perspective of a source T-PE. Illustratively, the procedure 600, may start at step 605, and continues to step 610, where, as described in greater detail above, a source device (e.g., T-PE1) transmits a data packet to a destination over a primary PW (e.g., an SS-PW or MS-PW). If in step 615 the source device receives the data packet returned with a loopback packet identifier (e.g., a reserved label or a control channel type) from the primary PW in response to a downstream failure, then in step 620 the source device may retransmit the data packet to the destination over a backup PW. Optionally, as noted above, the source (the node hosting primary and backup PWs) may also activate the backup PW in step 625, such as in response to receiving the returned data packet with the loopback packet identifier or otherwise learning of the failure on the primary PW (e.g., a failure notification via a PW status message, or in response to a locally detected failure). Note that once the source T-PE activates the backup PW, it will forward all subsequent packets directly over backup PW, while until this step is completed, the packets continue to traverse the failed PW to the point(s) of failure, return to the source as loopback traffic, and then get forwarded over the backup PW. In step 630, the source may return to transmitting subsequent data packets over the primary PW in step 630 in response to receiving an indication that the primary PW is repaired, e.g., in a conventional manner. The simplified procedure 600 illustratively ends in step 635, though notably with the option to send additional data packets over a functional primary PW, receive returned data packets, and so on, and the succession of steps is merely an example.

Figure 7:
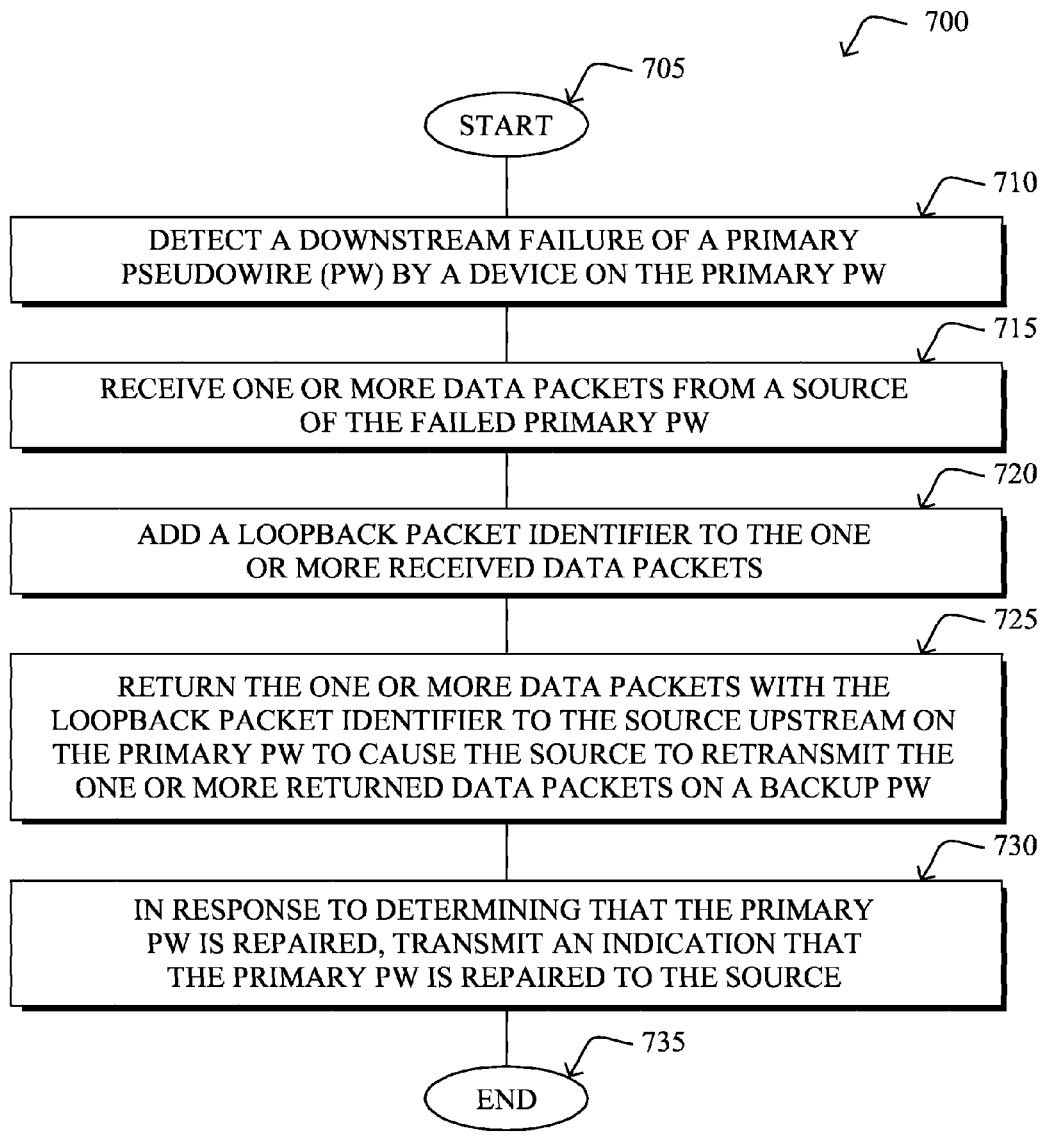
FIG. 7 illustrates another example simplified procedure for a data-plane driven fast protection mechanism for MPLS pseudowire services, particularly from the perspective of a failure detecting device.

Additionally, FIG. 7 illustrates another example simplified procedure 700 for a data-plane driven fast protection mechanism for MPLS pseudowire services in accordance with one or more embodiments described herein, particularly from the perspective of a failure detecting device (e.g., destination T-PE, intermediate S-PE, or LSR through which a tunnel LSP traverses). Illustratively, the procedure 700, may start at step 705, and continues to step 710, where, as described in greater detail above, a device on a primary PW path detects a downstream failure of a primary PW or the tunnel LSP carrying the primary PW (e.g., the PW itself has failed, or else the next-hop link (e.g., an attachment circuit) has failed beyond the primary PW). As such, upon receiving one or more data packets from a source from the failed primary PW at the device in step 715, the device adds a loopback packet identifier to the one or more received data packets in step 720, and in step 725 returns the one or more data packets (and any additionally received data packets) with the loopback packet identifier to the source upstream on the primary PW to cause the source to retransmit the one or more returned data packets on a backup PW, as described above. Notably, in one embodiment, in response to determining that the primary PW is repaired, in step 730 the device may transmit an indication that the primary PW is repaired to the source, as is conventionally done. The procedure 700 illustratively ends in step 735, notably with the option to continue receiving data packets and managing failures as described herein.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide for a data-plane driven fast protection mechanism for MPLS pseudowire services. In particular, the techniques herein prevent traffic loss following a failure as soon as the failure is detected at the point of failure (which can be multiple hops away from the T-PE hosting the backup PW), notably before the backup PW is activated, unlike existing mechanisms in which traffic loss prevails until the backup PW is activated. In addition, the performance of the techniques herein is scalable, and does not depend on the number of PWs impacted by a given failure. Moreover, the techniques herein are simple to implement (in software/hardware), and simple to deploy (e.g., with a configuration knob to enable/disable this mechanism at T-PE/S-PE).

Notably, the techniques herein do not send a notification message, but rather encapsulate the data packets once a failure is detected to loop the packet back to the source (head-end), so that the source can redirect the packet over the backup PW. Since the source is typically pre-programmed with the backup PW (PW redundancy), there is no additional PW required to support the techniques herein. That is, looping back the traffic allows for the use of the backup PW in "hot-standby" without engineering and provisioning additional PWs, and also provides for sufficient time for the source to activate the backup PW.

Additionally, planning for S-PE failure introduces significant complexity and requires two S-PEs at every segment boundary, and more importantly every S-PE at one segment boundary needs to be able to create a PW to both S-PEs at the other segment boundary. This type of backup strategy also requires co-ordination between segments. The techniques herein, on the other hand offers a straightforward and fast protection scheme. In particular, if the failing link or node cannot be detected by the T-PEs, the node/nodes that detect the failure loop the traffic back to the originating T-PE, which then sends the traffic down the backup PW, thus providing minimal packet loss and rapid switchover.

While there have been shown and described illustrative embodiments that provide for a data-plane driven fast protection mechanism for MPLS pseudowire services, it is to be understood that various other adaptations and modifications may be made within the spirit and scope of the embodiments herein. For example, the embodiments have been shown and described herein with relation to particular protocols and network configurations. However, the embodiments in their broader sense are not as limited, and may, in fact, be used with other types of networks and/or protocols. For instance, other bidirectional logical links aside from pseudowires may be used, and other network architectures aside from MPLS may also be used.

In addition, while certain combinations of PW types have been shown, such examples are not meant to be limiting to the embodiments herein. In particular, while the primary and backup PWs are shown as both SS-PWs or both MS-PWs, it is possible to protect a primary SS-PW by a backup MS-PW, and to protect a primary MS-PW by a backup SS-PW. In addition, the primary and backup PWs may each be statically provisioned or dynamically signaled (E.g., via LDP), though various embodiments herein may provide for the primary PW to be statically provisioned while the backup PW is dynamically signaled (e.g., via LDP), or else the primary PW may be dynamically signaled while the backup PW is statically provisioned.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   transmitting, by a source device in a network, a data packet from the source device to a destination device in the network over a primary pseudowire (PW), wherein the source device and the destination device are terminating provider edge (T-PE) devices;
   receiving, at the source device, the data packet returned with a loopback packet identifier in the data packet from the primary PW, in response to a downstream failure, wherein the loop packet identifier is added to the data packet by a device downstream of the source device that detected the downstream failure;
   in response to receiving the returned data packet with the loopback packet, retransmitting, by the source device, the data packet to the destination over a backup PW;
   receiving, at the source device, an indication that the primary PW is repaired; and
   in response, transmitting subsequent data packets over the primary PW.

2. The method as in claim 1, further comprising:
activating the backup PW in response to receiving the returned data packet with the loopback packet identifier.

3. The method as in claim 1, wherein the loopback packet identifier is selected from a group comprising a reserved label, a control channel type, or an arbitrary label that identifies loopback data packets to the source.

4. The method as in claim 1, wherein the loopback packet identifier is below a PW label in a corresponding label stack of the data packet.

5. The method as in claim 1, further comprising:
signaling the loopback packet identifier via PW signaling.

6. The method as in claim 1, wherein the primary PW and backup PW are one of either a single-segment pseudowire (SS-PW) or multi-segment pseudowire (MS-PW).

7. The method as in claim 1, wherein the primary PW is a primary multi-segment pseudowire (MS-PW), and wherein the returned data packet with the loopback packet identifier is originated by an intermediate switching provider edge (S-PE) device along the primary MS-PW.

8. A method, comprising:
detecting a downstream failure of a primary pseudowire (PW) by a device on the primary PW, wherein the device is a terminating provider edge (T-PE) device;
receiving one or more data packets from a source from the failed primary PW at the device;
adding, by the device, a loopback packet identifier to the one or more received data packets;
returning, by the device, the one or more data packets with the loopback packet identifier to the source upstream on the primary PW, wherein the loopback packet identifier added to the one or more returned data packets causes the source to retransmit the one or more returned data packets on a backup PW;
determining, by the device, that the primary PW is repaired; and
transmitting, by the device, an indication that the primary PW is repaired to the source.

9. The method as in claim 8, wherein the loopback packet identifier is selected from a group comprising a reserved label, a control channel type, or an arbitrary label that identifies loopback data packets to the source.

10. The method as in claim 8, wherein the loopback packet identifier is below a PW label in a corresponding label stack of the one or more data packets.

11. The method as in claim 8, wherein the primary PW is one of either a single-segment pseudowire (SS-PW) or multi-segment pseudowire (MS-PW).

12. The method as in claim 8, wherein the device is on a single-segment pseudowire (SS-PW) or a multi-segment pseudowire (MS-PW).

13. An apparatus, comprising:
one or more network interfaces to communicate within a computer network;
a processor coupled to the network interfaces and configured to execute one or more processes; and
a memory configured to store a process executable by the processor, the process when executed configured to:
transmit a data packet, as a source, to a destination over a primary pseudowire (PW), wherein the source and the destination are terminating provider edge (T-PE) devices;
receive the data packet returned with a loopback packet identifier in the data packet from the primary PW, in response to a downstream failure, wherein the loopback packet identifier is added to the data packet by a device downstream of the source device that detected the downstream failure; and
in response to receiving the returned data packet with the loopback packet identifier, retransmit the data packet to the destination over a backup PW;
receive an indication that the primary PW is repaired; and
in response, transmit subsequent data packets over the primary PW.

14. The apparatus as in claim 13, wherein the process when executed is further configured to:
activate the backup PW in response to receiving the returned data packet with the loopback packet identifier.

15. An apparatus, comprising:
one or more network interfaces to communicate within a computer network; a processor coupled to the network interfaces and configured to execute one or more processes; and
a memory configured to store a process executable by the processor, the process when executed configured to:
detect a downstream failure of a primary pseudowire (PW) as a device on the primary PW, wherein the apparatus is a terminating provider edge (T-PE) device;
receive one or more data packets from a source from the failed primary PW;
add a loopback packet identifier to the one or more received data packets; and
return the one or more data packets with the loopback packet identifier to the source upstream on the primary PW, wherein the loopback packet identifier added to the one or more returned data packets causes the source to retransmit the one or more returned data packets on a backup PW;
determine that the primary PW is repaired; and
transmit an indication that the primary PW is repaired to the source.

16. A system, comprising:
a source configured to transmit one or more data packets to a destination over a primary pseudowire (PW), wherein the source is a first terminating provider edge (T-PE) device; and
a device on the primary PW configured to detect a downstream failure of the primary PW, the device further configured to receive one or more data packets from the source from the failed primary PW, and to return the one or more data packets with a loopback packet identifier to the source upstream on the primary PW, wherein the device is a second T-PE device;
wherein the source is further configured to retransmit the one or more data packets to the destination over a backup PW in response to receiving the one or more returned data packets with the loopback packet identifier added to the returned one or more data packets, determine that the primary PW is repaired, and transmit an indication that the primary PW is repaired to the source.

17. The system as in claim 16, wherein the source is further configured to activate the backup PW in response to receiving the returned data packet with the loopback packet identifier.

18. The system as in claim 16, wherein the device is on a single-segment pseudowire (SS-PW) or a T-PE on a multi-segment pseudowire (MS-PW).

* * * * *